United States Patent [19]
Pruett et al.

[11] Patent Number: 5,778,389
[45] Date of Patent: Jul. 7, 1998

[54] METHOD AND SYSTEM FOR SYNCHRONIZING COMPUTER FILE DIRECTORIES

[75] Inventors: Paul S. Pruett, Columbia; Aaron W. Marshall, Nashville; Joel R. Jensen, Franklin, all of Tenn.

[73] Assignee: Electronic Data Systems Corporation

[21] Appl. No.: 652,065

[22] Filed: May 23, 1996

[51] Int. Cl.$^6$ .................................................. G06F 17/30
[52] U.S. Cl. ........................ 707/204; 707/10; 707/103
[58] Field of Search ............................. 395/617, 616, 395/619; 380/23; 707/201, 203, 8, 10, 204, 103

[56] References Cited

U.S. PATENT DOCUMENTS

| | | | |
|---|---|---|---|
| 4,875,159 | 10/1989 | Cary et al. | 395/619 |
| 5,163,148 | 11/1992 | Walls | 707/204 |
| 5,537,587 | 7/1996 | Kelley et al. | 395/616 |
| 5,600,834 | 2/1997 | Howard | 707/201 |
| 5,646,997 | 7/1997 | Barton | 380/23 |
| 5,666,530 | 9/1997 | Clark et al. | 395/617 |
| 5,680,609 | 10/1997 | Reinhardt | 707/10 |
| 5,708,812 | 1/1998 | Van Dyke et al. | 707/103 |
| 5,727,202 | 3/1998 | Kucala | 707/10 |

OTHER PUBLICATIONS

Fitzgerald, Michael, Desktop Computing, p. 35, Oct. 1993.
Patton, Carole, Desktop Computing, p. 40, Jan. 1994.
Fitzgerald, Micheal, Desktop Computing, p. 41, Jun. 1994.
Honeyman et al. "Communications and Consistency in Mobile File Systems", CITI Technical Report 95–11, Oct. 1995.
"Windows: Linkpro Announces the Shipment of Powersync, An Intelligent File", Edge: Work–Group Computering Report, Feb. 28, 1994.
Rigney, Steve "Linkpro Helps Keep your Files in Sync", PC Magazine–Network Edition, v13, No. 11, pNE38, Jun. 1994.
Linkpro Updates File–Sync Ware, Communications Week, Nov. 1994.
"Linkpro Software Synchronizes Network Data From Remote Users", Communications Week, Nov. 1994.
Satyanarayanan, Mahadev "Scalable, Secure, and Highly Available Distributed File Access", Computer Magazine, v23, No. 5, pp. 9–16, May 1990.
Satyanarayanan et al. "Coda: A Highly Available File System for a Distributed Workstation Environment", IEEE Transactions on Computers, v39, No. 4, pp. 447–459, Apr. 1990.
Kumar, Puneet "Coping with conflicts in a Optimistically Replicated File System", Management of Replicated Data, 1990 Workshop, p. 60–y4, 1990.
Satyanarayanan, Mahadev "The Influence of Scale on Distributed File System Design", v18, No. 1, pp. 1–8, Jan. 1992.
Satyanarayanan et al. "On the Ubiquity of Logging in Distributed File Systems", Workstation Operating Systems, 1992, pp. 122–125.
Satyanarayanan et al. "Hot Topics: Mobile Computing", Computer Magazine, v26, No. 9, pp. 81–82, Sep. 1993.
Varhol, Peter D. "Linkpro: no files Unsyncable—PowerSync v1.10", Mobile Office, v5, No. 9, p. 38, Sep. 1994.
Santalesa, Rich "Sync Files for Hard–disk Harmony: PowerSync 2.0", Windows Magazine, v6, No. 7, p. 86, Jun. 1995.
Kumar et al. "Log–Based Directory Resolution in the Coda File System", Parallel and Distributed Information Systems, 1993 Int'l Conf., pp. 202–213, 1993.

*Primary Examiner*—Thomas G. Black
*Assistant Examiner*—Charles L. Rones
*Attorney, Agent, or Firm*—Robert W. Holland; L. Joy Griebenow

[57] ABSTRACT

A method and system for automatically synchronizing a target and source directory in a computer system are provided. The system (8) includes a first file directory (32) which has a first plurality of files (33). A second file directory (70) has a second plurality of files (71). A directory synchronizer (14) sequentially selects one of the first plurality of files (33), determines whether one of the second plurality of files (71) is substantially similar to the selected one of the first plurality of files (33), and copies the selected one of the first plurality of files (33) into the second file directory (70) if no similar file is found.

13 Claims, 4 Drawing Sheets

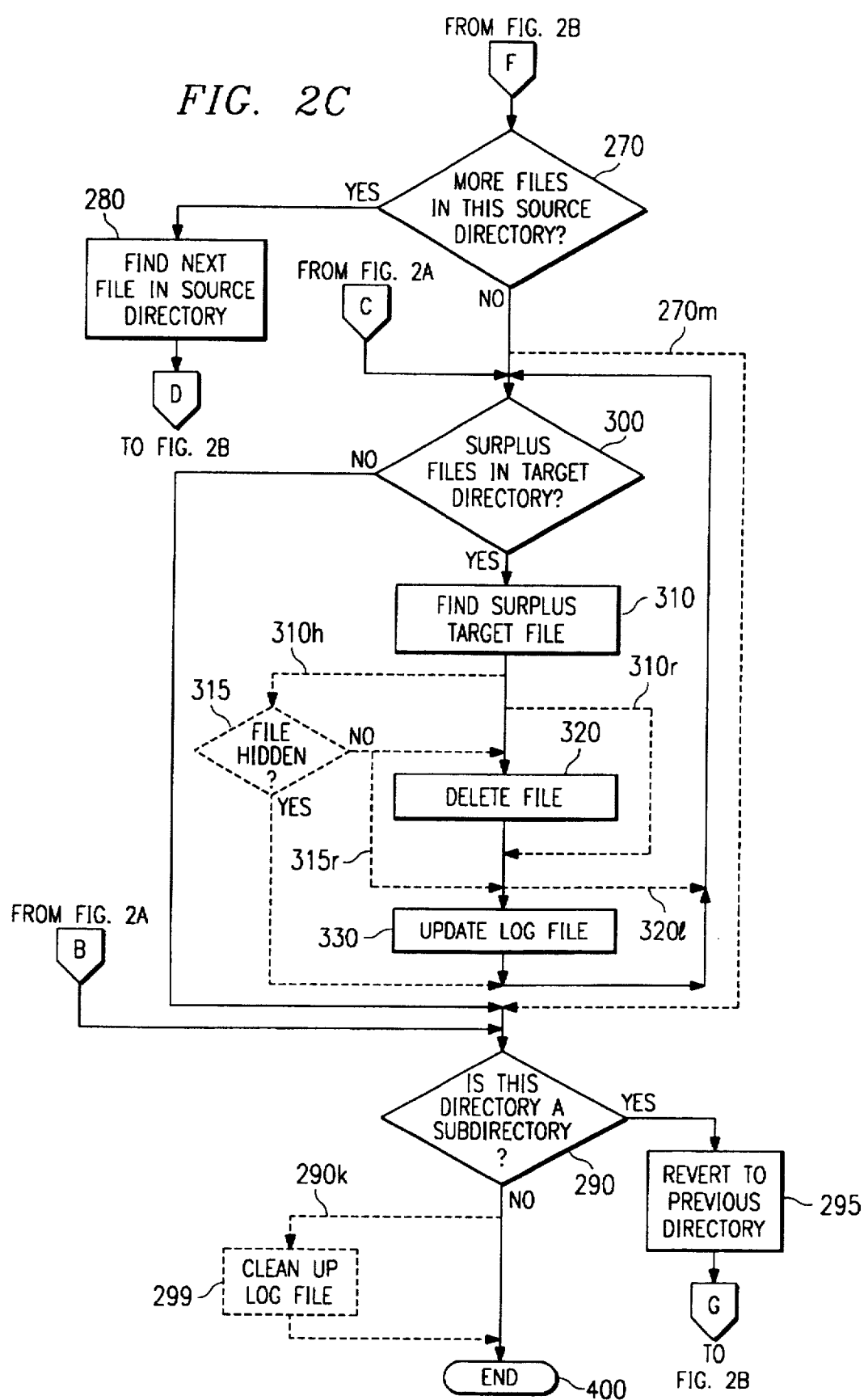

5,778,389

1

METHOD AND SYSTEM FOR SYNCHRONIZING COMPUTER FILE DIRECTORIES

TECHNICAL FIELD OF THE INVENTION

This invention relates generally to computer systems and more particularly to a method and system for synchronizing computer file directories.

BACKGROUND OF THE INVENTION

In client-server networks, files may be stored in a variety of file directories on a number of storage systems. Each file may contain data, source code, object code, text, or other types of information. For example, a typical client workstation or computer has a hard disk drive labeled "C:", as well as two floppy disk drives labeled "A:" and "B:". A single file server typically has a variety of logical drives labeled "F:" through "Z:". In a local area network (LAN) or a wide area network (WAN), there may be several file servers, each having a plurality of such drives. Each drive, whether on a file server or a client workstation, will usually contain a root directory and a number of subdirectories.

In some circumstances, it is desirable to copy the files resident in one directory or subdirectory into another directory or subdirectory. For example, if each user of the network is assigned a particular subdirectory for file storage, each user may be initially given a standard set of files and subdirectories within the user's subdirectory. This standard directory setup could be copied from a prototype directory created by a system administrator.

As another example, a network may have a plurality of file servers, each file server having a standard set of commercially-produced applications. When a new version of one of the applications is purchased or produced, it is necessary to replace the old version of that application on each file server. Since an application usually comprises many files resident in a variety of subdirectories, the process of replacing all of these files using standard network commands could be very time-consuming. Moreover, since the new version of the application will typically have many files which are identical to files from the previous version, it is highly inefficient to replace all of the files in the relevant subdirectories. Only those files which have changed in the new version of the application must be updated, in addition to copying new files into and deleting obsolete files from each file server. The process of creating, deleting and changing files in a "target" directory so as to make the target directory identical to a "source" directory is known as "synchronizing" the target and source directories.

In a network of IBM™-compatible personal computers using, for example, INTEL™ 80×86 microprocessors, standard DOS commands exist to copy files, delete files, create directories, copy directories and delete directories. However, no standard command exists to synchronize file directories. Synchronizing directories can be an inefficient and time-consuming process if executed using only standard operating system commands.

SUMMARY OF THE INVENTION

Therefore, a need has arisen for a simplified method or system for automatically synchronizing file directories in a computer system.

Accordingly, a method and system for automatically synchronizing a target and source directory are provided that substantially reduce or eliminate disadvantages associated with prior systems and methods.

According to one embodiment of the present invention, a method for automatically synchronizing file directories in a computer system is provided that sequentially selects one of a first plurality of files, determines whether a second plurality of files includes a file substantially similar to the selected one of the first plurality of files, and in response to such determination, copies the selected one of the first plurality of files.

According to an alternate embodiment of the present invention, a system for synchronizing file directories in a computer system is provided that comprises a first file directory having a first plurality of files stored on a first storage medium, a second file directory having a second plurality of files stored on a second storage medium, and a directory synchronizer for sequentially selecting one of the first plurality of files, for determining whether one of the second plurality of files is substantially similar to the selected file, and for copying the selected one of the first plurality of files into the second file directory.

A technical advantage of the present invention is that the method and system for automatically synchronizing a target and source directory accomplish synchronization efficiently, because only those files which are absent from or different in the target directory are copied from the source directory. Another technical advantage of the present invention is that files which are determined to be the same in the target and source directories are automatically left unchanged, thus eliminating the redundant copying of data from the source directory to the target directory.

BRIEF DESCRIPTION OF THE DRAWINGS

For a better understanding of the present invention, reference may be made to the accompanying drawings, in which:

FIGS. 2A through 2C are flow charts illustrating one embodiment of a file synchronization process.

DETAILED DESCRIPTION OF THE INVENTION

Figure 1:
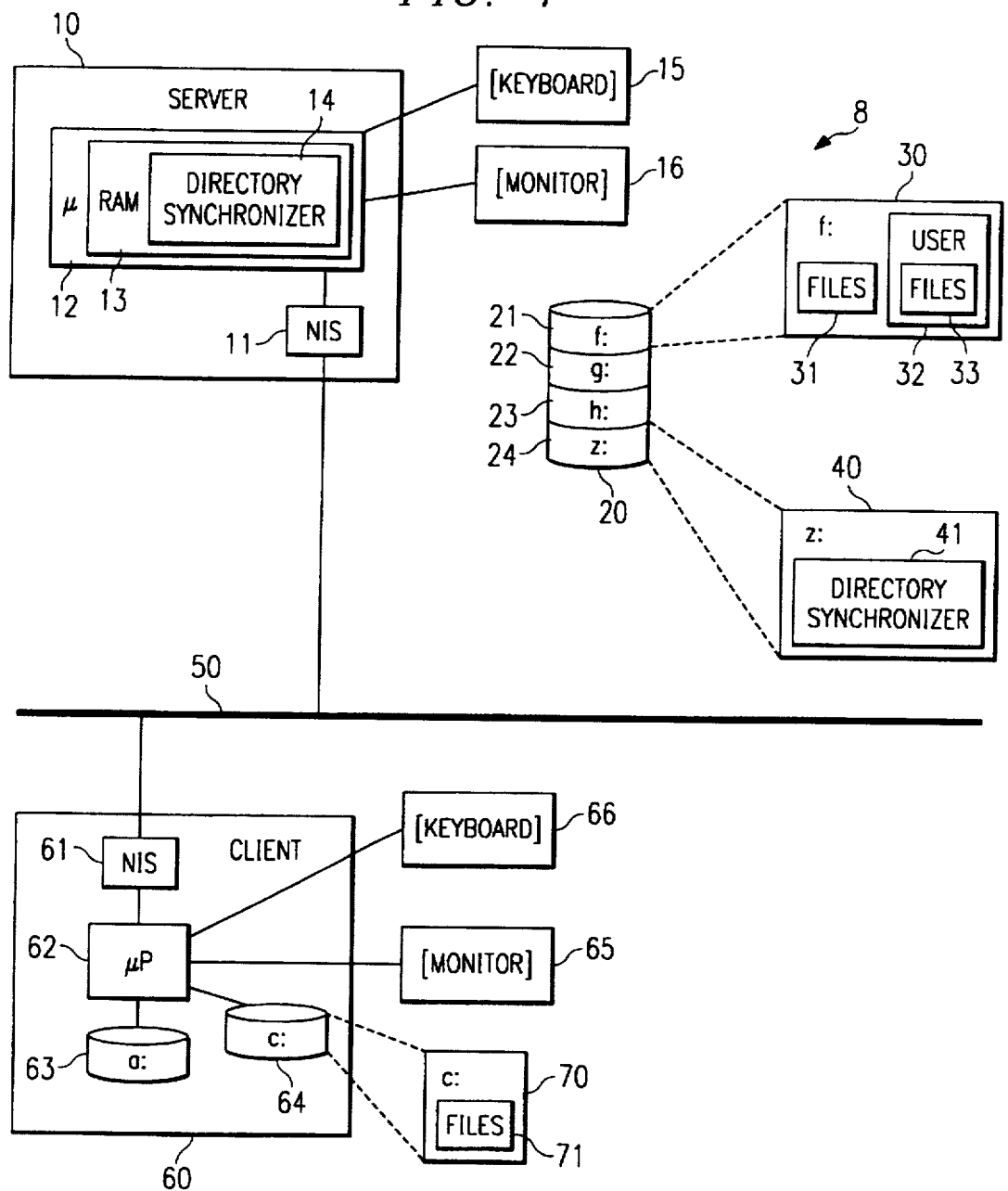
FIG. 1 is a block diagram of an exemplary local area network constructed in accordance with the invention.

An exemplary local area network (LAN) 8 constructed in accordance with the invention is shown in FIG. 1. LAN 8 includes a file server 10 and a client workstation 60. File server 10 and client 60 are connected to a network bus 50 by means of network interface systems 11 and 61, respectively. Server 10 has a microprocessor 12 which contains random access memory (RAM) 13. Microprocessor 12 is in communication with network interface system 11. A keyboard 15 and a monitor 16 in communication with microprocessor 12 provide input and output means, respectively, for a user to communicate with microprocessor 12. Microprocessor 12 also communicates with mass storage device 20, which may comprise, for example, a hard disk drive. Storage device 20 includes a plurality of logical drives 21 through 24. Logical drive 21 is operable to store data organized in a root directory 30, a first plurality of files 31, a subdirectory 32, and a second plurality of files 33. Logical drive 24 includes a root directory 40, which contains a directory synchronizer program 41 constructed in accordance with the present invention.

Client 60 includes a microprocessor 62 in communication with a network interface system 61, a floppy disk drive 63, a hard disk drive 64, a keyboard 66 and a monitor 65. Hard disk drive 64 is operable to store data organized in a root directory 70 and a plurality of files 71.

A user working at client workstation 60 may invoke program 41 to synchronize selected file directories. A number of parameters or qualifiers may be specified by the user when invoking program 41. Two important parameters are the names of a source directory and a target directory to be synchronized by program 41. Various optional qualifiers, which specify the running mode of program 41, will be discussed more fully below.

For complete synchronization of the target and source directories, the user must have the appropriate file permissions. Each file, program, or directory on a network or other computer system typically has a file permissions setting, which comprises a list of system users and the actions each user is allowed to take with respect to the file. The actions delimited by the file permissions setting include read, write, delete and execute. To completely synchronize the target and source directories using program 41, the user should have execute permission for program 41, read permission for the source directory, and read/write/delete permission for the target directory.

The method followed by program 41 when invoked by a user with the appropriate file permissions is shown in FIGS. 2A, 2B, 2C and 3. For exemplary purposes, it will be assumed that a user at workstation 60 wishes to synchronize directory 70 with directory 32. However, it is understood that any user with the appropriate permissions at any workstation on LAN 8 could invoke program 41 to synchronize any two directories accessible from LAN 8.

An example of a command entered by the user via keyboard 66 to invoke program 41 is as follows:

DRSYNC.EXE F:\USER C:/L:C\SYNC.LOG/S/P/T

In this command, "DRSYNC.EXE" is the name of program 41, "F:\USER" is the source directory 32, "C:" is the target directory 70, "C:\SYNC.LOG" is a log file, denoted by the preceding "/L:" qualifier, for recording the actions performed by program 41, and the remaining characters represent qualifiers which will be explained below.

When the user invokes program 41 with the above command, or with any other suitable command, microprocessor 12 loads program 41 into its RAM 13. Microprocessor 12 then executes the RAM-resident program 14. The process performed by program 14 will be first discussed in general, and then illustrated using the exemplary invocation command set forth above.

If the user specifies a log file using the "/L:" qualifier, then the file modifications described below will be delineated in statements appended to the end of the log file. Thus, if a log file used in a previous file synchronization process is selected in the current synchronization process, then notations from the current process will be appended to the log file, so that the entries associated with the two separate procedures are set forth in the same log file.

If the user specifies an "action" file using an "/I:" qualifier, then the action file will be consulted each time a source or target directory is encountered in the synchronization process, to determine what action should be taken with respect to that directory. The actions to be performed are set forth in the action file specified by the user after the "/I:" qualifier. Thus, a typical qualifier in the invocation command would be "/I:C:\DRSYNC.INI", in which case C:\DRSYNC.INI is the name of the action file which contains the actions to be taken with respect to various subdirectories.

Actions which can be specified in the action file are "synchronize" (denoted by a "0"), "merge" (denoted by a "1"), and "ignore" (denoted by a "2"). For example, the contents of DRSYNC.INI may be as follows:

|Default|
Action=0
|Directories|
\Programs\Accessories=1
\Programs\Accessories\Utilities=0
\Programs\Documentation=2

The statement "Action=0" indicates that the default action to be taken with respect to any directories not specifically identified in the action file is to synchronize the directories. The statements following "|Directories|" specify actions to be taken with respect to the named directories. For example, the contents of the "\Programs\Accessories" directory are to be merged, except for the "\Programs\Accessories\Utilities" subdirectory and its contents, which are to be fully synchronized. The "\Programs\Documentation" directory is to be ignored completely.

Each action set forth in the action file will be taken with respect to any directories or subdirectories within the target and source directories which have names incorporating the string set forth in that entry of the action file. For example, with F:\USER as the source directory and C: as the target directory, subdirectories named

F:\USER\PROGRAMS\DOCUMENTATION\WORD and

C:\PROGRAMS\DOCUMENTATION will both be ignored.

When a directory is to be merged, the process followed with respect to that directory is as if the user included a "/M" qualifier upon execution, as will be explained below. When a directory is to be ignored, the appropriate decisional steps set forth below will ensure that the directory is not included in the synchronization process. When a directory is to be synchronized, it will be neither merged nor ignored. Thus, the process performed with respect to that directory will be in accordance with the synchronization process outlined below.

If a "/M" qualifier is included in the invocation command, the source and target directories are "merged" rather than "synchronized." The only difference between the two procedures is in the treatment of files in the target directory which have different file names from the files found in the source directory. These files are known as surplus files. When the directories are synchronized, such files are deleted from the target directory, so that the source and target directories become identical. When the directories are merged, surplus files are left unchanged, so that after the merger process is complete, the target directory may contain more files than the source directory.

If a "/P" qualifier is included in the invocation command, the file permissions settings of existing target files will be altered to make them identical to the file permissions settings of the corresponding source files. If a "/T" qualifier is included in the invocation command, the file attributes of existing target files will be altered to make them identical to the file attributes of the corresponding source files, as will be explained more fully below.

If a "/R" qualifier is included in the invocation command, and a log file is specified using the "/L:" qualifier, then the directory synchronizer will only report in the log file the actions required to complete the synchronization or merger process requested by the user. However, the actions recorded in the log file will not actually be carried out, and the target directory will be left unchanged.

Figure 2A:
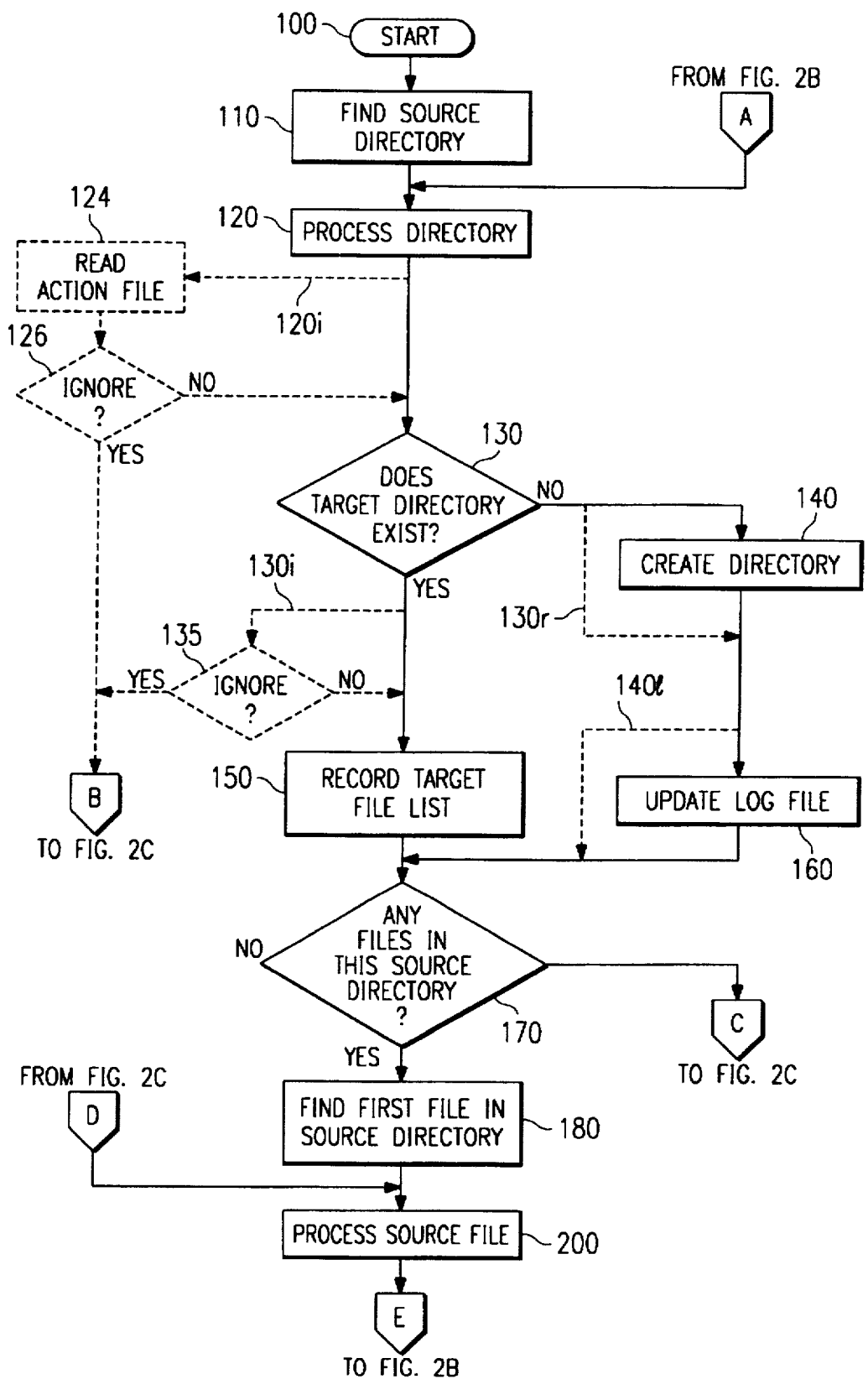
Figure 2B:
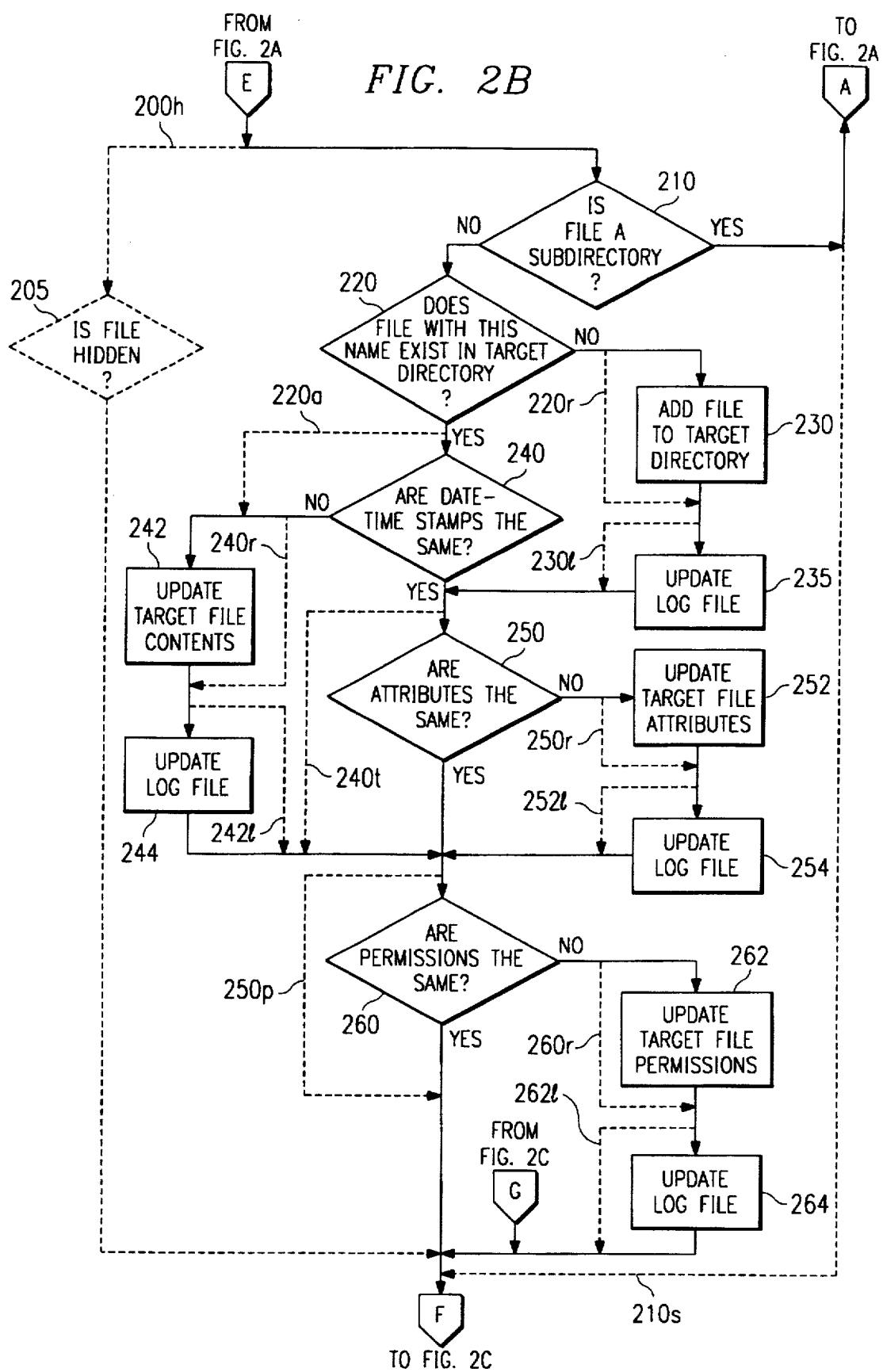

FIGS. 2A, 2B and 2C illustrate in solid lines a method for completely synchronizing the source and target directories and recording in a log file the actions taken during the process. This complete synchronization will be performed if the user includes the "/P", "/T", "/S" and "/L:" qualifiers in the invocation command, for reasons which will become apparent. If any of these qualifiers are omitted, or if other qualifiers are included, the process may deviate from that shown in solid lines. The deviations are illustrated by paths and steps shown in dotted lines, and are described in detail herein.

Referring to FIG. 2A, the method performed by program 14 begins at step 100. The method then proceeds to step 110, where the source directory information input by the user as a parameter in the invocation command is read and the source directory is located. Processing of the source directory begins at step 120. The method then proceeds to decisional step 130.

Note that the directory being processed beginning at step 120 may be the source directory originally specified in the invocation command, or it may be some subdirectory thereof, as will be made apparent from the description of steps 210 and 295 below. Whichever directory or subdirectory is being processed at step 120 shall be referred to herein as the source directory, for purposes of simplicity. Thus, it should be noted that when the term "source directory" appears herein, it does not necessarily refer to the source directory specified at execution, but may refer instead to some subdirectory thereof.

If the "/I:" qualifier was included in the invocation command, indicating that the user wishes to take different synchronization actions with respect to different target or source subdirectories, then the method proceeds from step 120 to step 124, as illustrated by path 120*i*. At step 124, the action file specified using the "/I:" qualifier is read to determine the action to be taken with respect to the source directory being processed.

The method then proceeds to decisional step 126, where it is determined whether the action specified in the log file with respect to the source directory being processed is to "ignore" the directory. If the directory is to be ignored, the method then proceeds to step 290, which will be described below. If the directory is not to be ignored, the method proceeds to decisional step 130, where it is determined whether a target directory with the name given by the user in the invocation command exists. If the target directory exists, the method then proceeds to step 150.

If the user specified an action file with the "/I:" qualifier upon execution, the method proceeds from decisional step 130 to decisional step 135, as illustrated by path 130*i*. At decisional step 135, it is determined whether the action specified in the action file with respect to the target directory located in step 130 is to "ignore" the directory, in which case the method proceeds step 290.

If the target directory located in step 130 is not to be ignored, the method proceeds from step 135 to step 150, where it is determined what files, if any, are in the target directory, and the names of the target files are recorded. The method then proceeds to decisional step 170.

Returning to decisional step 130, if the target directory does not exist, the method proceeds to step 140, where the target directory is created. The method then proceeds to step 160. However, if the "/R" qualifier was included in the invocation command, indicating a desire to "report only" the actions required to synchronize the target and source directories, then the method proceeds from step 130 directly to step 160, as illustrated by path 130*r*.

At step 160, a notation is added to the log file indicating the creation of the target directory. The method then proceeds to decisional step 170. However, if no log file was specified when program 14 was executed, then the method proceeds from step 140 directly to decisional step 170, as illustrated by path 1401.

At decisional step 170, it is determined whether there are any files in the source directory or subdirectory currently being processed. If there are files in the source directory, the method proceeds to step 180. If there are no files in the source directory, the method proceeds from step 170 to step 300.

At step 180, the first file in the source directory is selected. The method then proceeds to step 200, where the processing of the selected file from the source directory begins.

Referring to FIG. 2B, the method proceeds to decisional step 210, where it is determined whether the currently selected file is actually a subdirectory of the source directory. Since subdirectories and standard data files are intermingled in a directory listing, a "file" encountered in the processing of a directory may actually be a subdirectory. If the currently selected file is a subdirectory, the method proceeds to step 120, where processing of the subdirectory begins in the manner previously described.

If the file is not a subdirectory, the method proceeds from step 210 to decisional step 220, where it is determined whether a file having the same name as the currently selected file from the source directory exists in the target directory. If no such file exists, the method proceeds to step 230, where the currently selected file from the source directory is copied into the target directory.

The method then proceeds to step 235, where a notation is added to the log file to indicate the addition of the file to the target directory. If the "/R" qualifier was included in the invocation command, then the method proceeds from step 220 directly to step 235, as illustrated by path 220*r*. If no log file was specified in the user's invocation command, the method skips step 235 and proceeds from step 230 to step 250, as illustrated by path 2301.

Returning to decisional step 220, if a file having the same name as the currently selected file from the source directory exists in the target directory, the method proceeds to decisional step 240. The object of step 240 is to determine whether the source and target files have identical file contents. If the contents are identical, then there is no need to copy the contents of the source file into the target file.

To determine whether the source and target files have identical contents at step 240, directory synchronizer 14 compares the date-time stamps of the files to determine whether they are identical. The date-time stamp of a file typically records the last time and date that a user modified the file. When a file is copied, both the contents and the date-time stamp of the original file will be reproduced in the copy. If the contents of the copy are then altered, its date-time stamp will reflect the date and time the alteration was made, and will no longer be identical to the date-time stamp of the original file. Moreover, the chances of two unrelated files having identical date-time stamps is very small. Therefore, comparison of the date-time stamps of two files is a reliable means for determining whether the files have identical contents.

If the date-time stamps of the source and target files are determined to be different at decisional step 240, then the method proceeds to step 242, where the contents of the source file are copied into the target file. When this copying is completed, the computer operating system typically updates the date-time stamp and attributes of the target file automatically to make them identical to the date-time stamp and attributes of the source file. The method then proceeds to step 244, where the log file is updated to indicate the alteration of the target file performed at step 242.

Returning to decisional step 240, if the date-time stamps of the source and target files are different and the "/R" qualifier was included in the invocation command, then the method proceeds directly to step 244, as illustrated by path 240r. If no log file was specified in the user's invocation command, then the method skips step 244 and proceeds directly to decisional step 260, as illustrated by path 242l.

Returning to decisional step 220, if a file having the same name as the currently selected file from the source directory exists in the target directory, and the user included the "/A" qualifier upon execution, then the method proceeds to step 242, as illustrated by path 220a. The "/A" qualifier indicates that the user wishes to "always copy" files from the source directory into the target directory, even if an identical file in the target directory exists. Thus, if the user has chosen to "always copy" source files into the target directory, a comparison of the source and target files to determine whether the files are identical is not performed. Instead, the target file with the same name as the source file is automatically written over at step 242.

Returning to decisional step 240, if the date-time stamps of the source and target files are determined to be the same, the method proceeds to decisional step 250, where it is determined whether the attributes of the source and target files are the same. The attributes of a file are a set of flags which primarily determine the accessibility of the file. The flags included in the file attributes are a read-only flag which prevents users from altering the file; a "hidden" flag which prevents the file from showing up in a standard directory listing; a system flag which may restrict access to the file and/or make the file "hidden," depending on the operating system being used; and an "archive" flag, which is typically used to mark the file as an altered version which has not yet been backed up. The archive flag is then automatically reset during a periodic file backup process.

Step 250 may involve the comparison of any or all of the file attributes flags. If the relevant attributes of the source and target files are determined to be different, then the method proceeds to step 252, where the attributes of the target file are altered in accordance with the attributes of the source file. The method then proceeds to step 254, where the log file is updated to indicate the alteration of the target file performed at step 252.

Returning to decisional step 250, if the attributes of the source and target files are different and the "/R" qualifier was included in the invocation command, then the method proceeds directly to step 254, as illustrated by path 250r. If no log file was specified in the user's invocation command, then the method skips step 254 and proceeds directly to decisional step 260, as illustrated by path 252l.

Returning to decisional step 250, if the attributes of the source and target files are determined to be the same, the method proceeds to decisional step 260, where it is determined whether the file permissions of the source and target files are the same. As previously discussed, the file permissions setting of a file is a list of system users, either individually or in groups, and the actions each user or groups of users is allowed to take with respect to the file. If the file permissions of the source and target files are determined to be different, then the method proceeds to step 262, where the file permissions of the target file are altered in accordance with the file permissions of the source file. The method then proceeds to step 264, where the log file is updated to indicate the alteration of the target file performed at step 262.

Returning to decisional step 260, if the file permissions of the source and target files are different and the "/R" qualifier was included in the invocation command, then the method proceeds directly to step 264, as illustrated by path 260r. If no log file was specified in the user's invocation command, then the method skips step 264 and proceeds directly to decisional step 270, as illustrated by path 262l. If at step 260 the file permissions of the source and target files are determined to be the same, the method proceeds to decisional step 270.

Returning to step 240, if the user did not include the "/T" qualifier upon execution, then the method proceeds from step 240 to step 260, as illustrated by path 240t. If the user did not include the "/P" qualifier upon execution, then the method proceeds from step 250 to step 270, as illustrated by path 250p. Thus, the steps of updating the target file permissions and attributes, which are necessary for true synchronization of the source and target directories, are optional.

Referring to FIG. 2C, at decisional step 270 it is determined whether there are files in the source directory which have not yet been processed. If so, then the method proceeds to step 280, where the pointer is incremented to indicate the next file in the source directory. The method then proceeds to step 200, where processing of the file indicated at step 280 is begun.

Returning to step 200 in FIG. 2A, if a "/H" qualifier was specified upon execution, indicating a desire to synchronize only those files which are not "hidden," then the method proceeds to decisional step 205, as illustrated by path 200h. At decisional step 205, it is determined whether the "hidden" flag for the currently selected source file has been triggered, indicating that the currently selected file is a hidden file. If the file is not hidden, the method proceeds to decisional step 210. If the file is hidden, the method proceeds to decisional step 270. Thus, if the user has included the "/H" qualifier, hidden files in the source directory are not synchronized with the target directory.

Returning to decisional step 210, if the file is a subdirectory and the user has not included the "/S" qualifier, then the method proceeds to decisional step 270, as illustrated by path 210s. The "/S" qualifier indicates that the user wishes to synchronize all subdirectories of the source directory. Thus, if the user has not chosen to synchronize subdirectories of the source directory, the method does not process any source file which is a subdirectory, nor any files contained within the subdirectory.

At decisional step 270, if there are no more source files remaining to be processed in the source directory, the method proceeds to decisional step 300, where it is determined whether surplus files not found in the source directory are present in the target directory. If such files are present, the method proceeds to step 310, where one of the surplus files in the target directory is located. The method then proceeds to step 320, where the selected surplus target file is deleted. The method then proceeds to step 330, where a notation is added to the log file to indicate the deletion of the surplus target file.

From step 330, the method proceeds back to decisional step 300, where it is determined whether any more surplus files are present in the target directory. If more surplus files are present, they are likewise deleted by repetition of the steps described above.

Returning to step 310, if the user included the "/H" qualifier upon execution, then the method proceeds from step 310 to decisional step 315, as illustrated by path 310h. At decisional step 315, it is determined whether the surplus target file selected at step 310 is a hidden file. If the file is not hidden, the method proceeds to step 320 where the file is deleted, unless the "/R" qualifier was included in the invocation command, in which case the method proceeds to step 330, as illustrated by path 315r. If the file is hidden, then the file is not deleted, and the method proceeds to decisional step 300.

Returning to step 310, if the "/R" qualifier was included in the invocation command, then the method proceeds from step 310 directly to step 330, as illustrated by path 310r. Returning to step 320, if the user did not specify a log file upon execution, then the method proceeds from step 320 to decisional step 300, as illustrated by path 320l.

Returning to step 270, if there are no files remaining to be processed in the source directory, and if the user included the "/M" qualifier at execution, indicating a desire to merge, rather than synchronize, the source and target directories, or if a statement in the selected action file indicates that either the source or target directory is to be merged, then the method proceeds from step 270 to step 290, as illustrated by path 270m. Thus, when the user elects to merge the two directories, no files are deleted from the target directory. Only those target files which have the same file names as files present in the source directory are altered in the merging process, along with the addition of files from the source directory which were not already present in the target directory.

When it is finally determined at step 300 that no more surplus files exist in the target directory, the method proceeds to decisional step 290, where it is determined whether the source directory which has just been processed is a subdirectory of the source directory specified at execution. If so, then the method proceeds to step 295, where the next lower directory or subdirectory in the directory tree below the subdirectory just processed is selected for further processing. The method then proceeds to decisional step 270.

If it is determined at step 290 that the directory in question is not a subdirectory of the source directory, then the method proceeds to step 400. However, if the user included the "/K:n" qualifier upon execution, in which n is a positive integer, then the method proceeds from step 290 to step 299, as illustrated by path 290k. The "/K:" qualifier indicates a desire to "clean up" the log file by deleting all entries except those from the last n processes. At step 299, notations from all previously-run synchronization processes are erased, except that notations relating to the current process and the n-1 processes immediately preceding the current process are retained in the log file. From step 299, the method proceeds to step 400, where the method performed by program 14 ends.

To further illustrate the operation of program 14, the steps performed by program 14 upon invocation by the user command set forth above will be described. The process begins at step 100. At step 110, it is determined that "F:\USER," or directory 32, is the source directory for this synchronization process. At step 120, processing of directory 32 begins. At decisional step 130, it is determined that "C:", or directory 70, is the target directory.

Since directory 70 already exists, the method proceeds to step 150, where a listing of the existing target files 71 is recorded. At decisional step 170, it is determined that files 33 exist in directory 32. Therefore, the method proceeds to step 180, where a first one of the source files 33 is selected. At step 200, the processing of the selected source file begins.

At step 210, it is determined that the selected source file is not a subdirectory. Therefore, the method proceeds to decisional step 220, where the name of the selected one of the source files 33 is compared with the names of target files 71. Assuming that a target file with the same name does exist, the method proceeds to decisional step 240, where, if it is determined that the source and target files are different, the method proceeds to step 250.

At step 250, the target file is altered in accordance with the steps shown in FIG. 3. The "/P" and "/T" qualifiers were included in the invocation command. Thus, at step 252, the file permissions setting of the target file is altered to make it identical to the file permissions setting of the source file. Likewise, the file attributes, file contents, and date-time stamp of the target file are altered to make them identical to the corresponding properties of the source file.

Returning to FIG. 2B, the method proceeds from step 250 to step 260, where a notation is made in the log file, in this case C:\SYNC.LOG, to indicate the alteration of the target file. At step 270, it is determined that there are more files in directory 32, so the method proceeds to step 280, where the pointer is incremented to select the next one of the source files 33. Beginning at step 200, this source file is processed in the manner described above. When all of the files 33 in the source directory 32 have been processed, a "NO" answer at decisional step 270 causes the method to proceed to step 300.

At step 300, it is determined whether any of the target files 71 have file names which do not appear in source directory 32. Any such files are known as surplus target files, and are deleted at steps 310 and 320. The deletions are recorded in the log file at step 330. When all of the surplus files have been deleted, the method proceeds from step 300 to decisional step 290, where it is determined that the directory currently being processed, directory 32, is the originally specified source directory. Therefore, the method proceeds to step 400, at which point the process is terminated.

While the invention has been particularly shown and described by the foregoing detailed description, it will be understood by those skilled in the art that various other changes in form and detail may be made without departing from the spirit and scope of the invention which is solely defined by the appended claims.

What is claimed is:

1. A system for synchronizing file directories in a computer system, said synchronizing system comprising:
    a source file directory having a plurality of source files stored on a first storage medium;
    a target file directory having a plurality of target files stored on a second storage medium;
    a directory synchronizer for sequentially selecting each of the source files, for determining whether one of the target files is substantially identical to each selected source file, and for automatically copying each source file that is not substantially similar to a target file into the target file directory; and
    wherein the directory synchronizer is operable to identify and delete any surplus files from the target directory.

2. The system of claim 1 wherein the directory synchronizer is operable for recording in a log file actions performed by the directory synchronizer.

3. A method for automatically synchronizing a target directory and a source directory in a computer system having plural directories, the target directory having plural target files, each target file having a target file name, the source directory having plural source files, each source file having a source file name, the method comprising the steps of:

selecting a source directory from the plural directories;

selecting a target directory from the plural directories;

for each source file, automatically determining whether any target file has the same name as the source file, whether any target file having the same name comprise a substantially similar file, and whether any target file is a surplus file; and in response to said determining step, automatically copying each source file to the target directory if the target file having the same name is not substantially similar to the source file, leaving target files unchanged if the target files are substantially similar to source files, and automatically deleting surplus files.

4. The method of claim 3, wherein the step of determining comprising the steps of: reading a date-time stamp of a selected one of the source files;

selecting one of the target files;

reading a date-time stamp of the selected one of the target files; and determining whether the date-time stamp of the selected one of the source files is the same as the date-time stamp of the selected one of the target files.

5. A method for automatically synchronizing plural file directories stored in plural computer systems, comprising the steps of:

selecting a source directory from one of the plural file directories, the source directory stored on a first computer system, the source directory having plural source files;

selecting a target directory from one of the plural directories, the target directory stored on a second computer system, the target directory having plural target files;

selecting each source file from the source directory, each source file having a source file name;

determining whether a target file having a target file name associated with each source file name exists in the target directory;

determining whether the target directory has surplus files;

the target directory has surplus files, deleting the surplus files;

if a target file does not exist in the target directory, creating a file in the target directory, the created file having the associated source file name;

if a target file exists in the target directory, determining whether the target file is substantially identical to the associated source file; and if a target file exists in the target directory, and if the target file is not substantially identical to the associated source file, automatically altering the target file.

6. The method of claim 5, wherein the step of determining whether a target file is substantially identical to the associated source file comprises the steps of:

reading a date-time stamp of the target file;

reading a date-time stamp of the associated source file; and determining whether the date-time stamp of the target file is the same as the date-time stamp of the associated source file.

7. The method of claim 6, wherein the step of altering the target file comprises the step of copying a contents portion of the associated source file into a contents portion of the target file.

8. The method of claim 5, wherein the step of determining whether the target file is substantially identical to the associated source file comprises the steps of:

reading a plurality of attributes of the target file;

reading a plurality of attributes of the associated source file; and determining whether the attributes of the target file are the same as the attributes of the associated source file.

9. The method of claim 8, wherein the step of altering the target file comprises the step of altering at least one of the attributes of the target file in response to the attributes of the associated source file.

10. The method of claim 6, wherein the step of altering the target file comprises the step of altering the date-time stamp of the target file in response to the date-time stamp of the associated source file.

11. The method of claim 5, wherein the step of determining whether the target file is substantially identical to the associated source file comprises the steps of:

reading a file permissions setting of the target file;

reading a file permissions setting of the associated source file; and determining whether the file permissions setting of the target file is the same as the file permissions setting of the associated source file.

12. The method of claim 11, wherein the step of altering the target file comprises the step of altering the file permissions setting of the target file in response to the file permissions setting of the associated source file.

13. The method of claim 5, wherein the step of creating the file in the target directory comprises the step of copying the associated source file into the target directory.

* * * * *